United States Patent Office 3,434,106
Patented Mar. 18, 1969

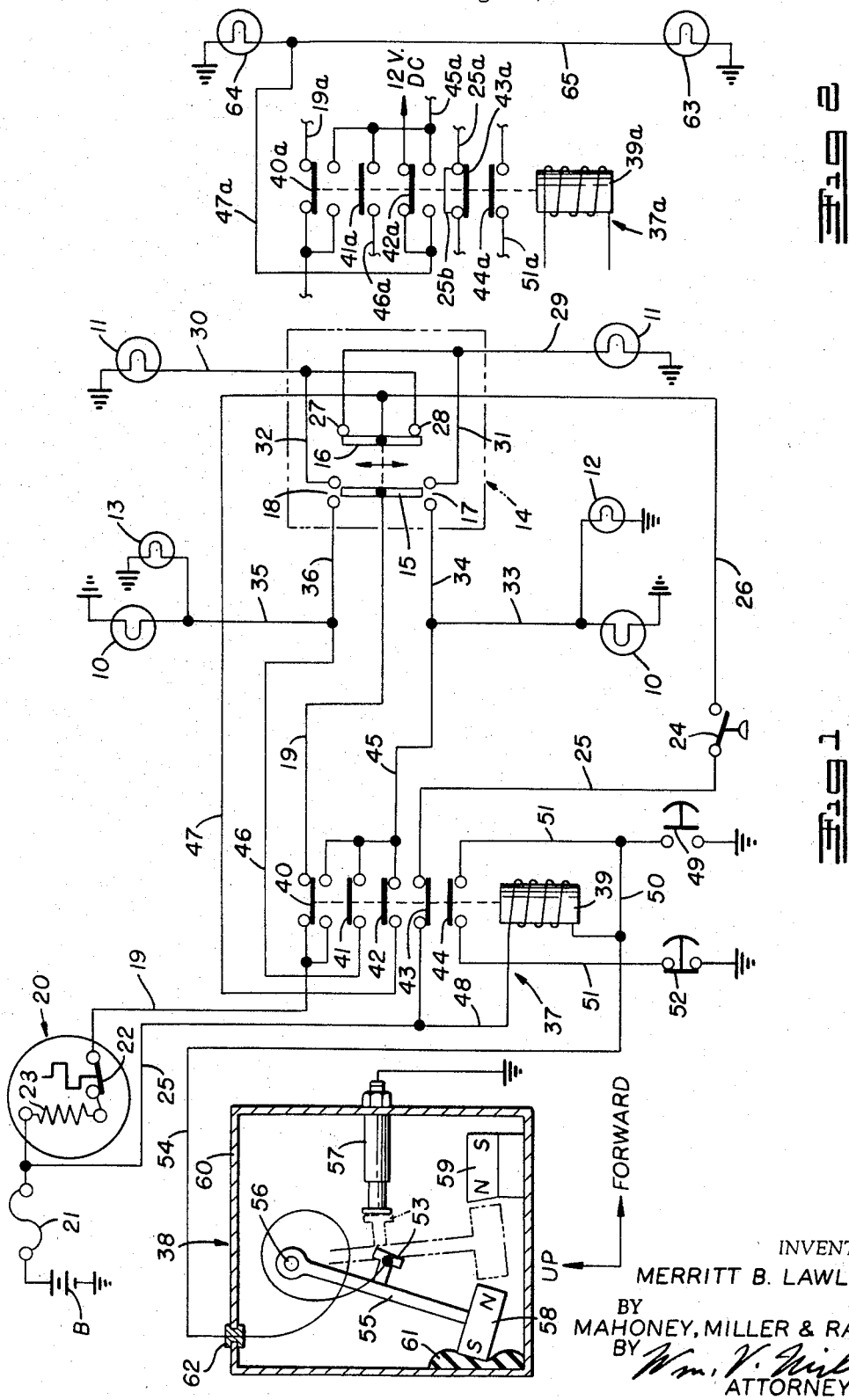

3,434,106
AUTOMATIC EMERGENCY SIGNALING SYSTEM
FOR A VEHICLE
Merrittt B. Lawless, Birch Drive (NN), Harmony Acres,
Mickleton, N.J. 08056
Filed Aug. 16, 1966, Ser. No. 572,829
U.S. Cl. 340—55                              12 Claims
Int. Cl. B60q 1/44

ABSTRACT OF THE DISCLOSURE

A signaling system for motor vehicles in which all turn indicator lights of the vehicle are automatically flashed when an emergency stop is made. On rapid deceleration, an inertia switch closes a circuit to a self-held relay which disconnects the turn indicator selector switch and the brake operated switch and applies to output of the turn signal flasher switch simultaneously to all of the turn signal lights. The tail lights may also be flashed concurrently when an emergency stop is made.

---

This invention relates, in general, to a vehicular signaling system and relates, more specifically, to a signaling system which is operative to automatically indicate an emergency stop involving rapid deceleration of the vehicle.

It is the current practice to equip motor vehicles with a signaling system which provides a four-way flashing light with pairs of lights disposed at opposite ends of the vehicle to indicate that the vehicle has come to an emergency stop. These prior art systems are of the manually-operated type and designed to be operated only after the vehicle has come to a stop and the operator has opportunity to manually turn the switch to an "on" position for illuminating the flashing lights. In the usual installation, the lighting elements forming the emergency signaling system include the usual turn and parking lights at the front of the vehicle and the rear brake and turn lights but do not utilize the flasher system with which the vehicle is originally provided for operating the signal lights in the usual turn signaling mode. An auxiliary flasher circuit is connected in circuit with the front and rear lights and is independently operated to provide the emergency flashing system. Being manually operated, the prior art apparatus requires the operator to place the system into operation for signaling other motor vehicle operators of an emergency condition. In the usual installations, the manual switch is placed at an inconvenient location and the operator is thus prevented from using the system to provide a warning signal while the vehicle is in motion. Furthermore, even after the vehicle has been brought to a stop, the emergency flashing system will not be in operation unless the switch is first actuated by the operator. At times, the operator may not remember to place the system in operation and the effect will thus be lost as to warning of other vehicle operators even though an emergency situation is present.

It is, therefore, the primary object of this invention to provide a signaling system for a vehicle which will automatically operate on rapid deceleration of the vehicle or sudden stopping to provide a four-way flashing signal to other vehicle operators.

It is a further object of this invention to provide an emergency signaling system which will automatically connect all turn signal lights on the vehicle in circuit for simultaneous flashing operation as a consequence of rapid deceleration of the vehicle through operation of an acceleration-responsive switch.

It is another object of this invention to provide an emergency signaling system which utilizes a single cyclic switch mechanism for effecting the flashing operation in either the emergency signaling mode of operation or the normal, directional turn signal mode of operation.

It is also an object of this invention to provide an automatic signaling system for indicating an emergency stop or emergency situation and which may be manually placed in operation by the operator as desired.

These and other objects and advantages of this invention will be readily apparent from the following detailed description thereof and the accompanying drawing.

In the drawing:

FIGURE 1 is a schematic, electric circuit diagram of the signaling system embodying this invention.

FIGURE 2 is a schematic, electric circuit diagram of a modification of the circuit shown in FIGURE 1.

Having reference to FIGURE 1 of the drawings, the signaling system of this invention is shown as adapted for utilizing the conventional front turn and parking lights 10 and the rear brake and turn lights 11 with a light placed adjacent each corner of the vehicle. Also shown connected in parallel with the front turn lights 10 are the dashboard mounted indicator lights 12 and 13 which indicate left and right turns, respectively, to the vehicle operator. A directional turn signal switch 14 of conventional construction is shown interconnected with the front and rear signaling lights 10 and 11 and includes two mechanically interconnected movable switch elements 15 and 16. The movable switch element 15 may be selectively operated to cooperatively engage the pairs of terminals 17 and 18 which are associated with the left and right turn signaling functions, respectively. One terminal of each of the terminal pairs 17 and 18 is connected to a respective forward or front turn light and a second terminal is connected to a respective rear brake and turn light 11. The movable switch element 16, which is associated with the braking function of the vehicle, is movable with the turn indicating switch element 15 and is operable to disconnect the respective brake light associated with the particular turn from the brake signaling circuit and permit its operation in conjunction with the turn-indicating switch element 15.

An electrical supply circuit to the directional turn signal switch 14 is provided by a conductor 19 connecting with the movable switch element 15 and an output terminal of a cyclically operable switch or flasher switch 20. The input terminal of the flasher switch 20 is connected to a suitable source of direct current electrical power such as may be provided by a vehicle's battery supply B as is diagrammatically indicated in FIGURE 1. A fuse element 21 may also be inserted in this circuit to the flasher switch 20 as is well known for protection of the system. The flasher switch 20, which is of conventional construction, includes a temperature-responsive switch element 22 which is normally closed and a resistive type heating element 23. Electric current flowing through the resistance element 23 will produce heat causing the switch element 22 to open and interrupt the circuit. While the circuit is interrupted through opening of the switch 22, the resistance heating element 23 will cool and thus permit the switch element 22 to return to its normally closed configuration. Upon completing the circuit, the flasher switch 20 will continue cyclic operation to produce an intermittent power supply for the elements connected thereto.

Also included in the usual vehicle electrical system is a brake signaling circuit which includes a brake-responsive switch 24 which is operated by fluid pressure from the hydraulic brake system. One terminal of the brake switch 24 is connected to the power source by a conductor 25 through the fuse element 21 and which is shown as connected to the input terminal to the flasher switch 20 and the opposite terminal is connected by a conductor 26 to the movable switch element 16 of the directional turn signal switch 14. The switch element 16 is normally in simultaneous electrical contact with two terminals 27 and 28 which are connected to the respective left and right brake and turn lights 11 located at the rear of the vehicle. Closing of the brake switch 24 in response to actuation of the brake mechanism will complete a circuit to the element 16 of the directional turn signal switch and energize both rear brake lights simultaneously when the directional turn signal switch is in a centered position as illustrated. Each of the rear brake and turn lights 11 is connected to the respective terminal 27 or 28 by the conductors 29 and 30, with each conductor 29 and 30 also being connected by a branch conductor 31 and 32 to a terminal of the respective terminal pairs 17 and 18.

In the normal directional turn indicating mode of operation of the system illustrated in FIGURE 1, the directional turn signal switch 14 would be actuated to shift the movable switch elements 15 and 16 in the desired direction. In the case of a left turn, the switch elements 15 and 16 would be displaced downwardly with respect to the drawing, causing the movable switch element 15 to engage the pair of terminals 17 and the switch element 16 to be disconnected from the terminal 27. An electrical circuit would thus be completed through the flasher switches 20, the conductor 19 and the switch element 15 to the pair of terminals 17. The left rear turn light or brake light 11 is connected to one terminal of the terminal pair 17 through the conductors 29 and 31, and the front turn light 10 and panel indicator light 12 are connected to the opposite of the terminal pairs 17 through the conductors 33 and 34. Thus the turn lights 10 and 11 at the left side of the vehicle will be intermittently illuminated through operation of the flasher switch 20. Placing the directional turn signal switch to the opposite direction will result in a similar right turn indicating circuit position. In that instance, the right rear turn light 11 would be connected to one terminal of the terminal pair 18 by the conductors 30 and 32 while the right front light 10 and panel indicator light 13 would be connected to the opposite terminal of this pair through the conductors 35 and 36. In either instance, the opposite rear turn and brake light 11 could be independently energized through operation of the brake responsive switch 24.

In accordance with this invention, additional circuit means is incorporated with the conventional turn signaling circuit to provide the automatic emergency signaling function. This additional circuit means includes an electrically actuated switch means indicated generally at 37 and an acceleration-responsive switch indicated generally at 38. The electrically-actuated switch means 37 comprises a relay switch mechanism having an operating solenoid 39 for operating the several movable contacts 40 through 44. The movable contact 40 is associated in normally closed relationship to a pair of terminals which are interposed in the conductor 19. This contact is also associated in normally open relationship to a second pair of terminals which are interposed in a conductor 45 connected between the output terminal of the flasher switch 20 and the conductor 33 leading to the left front turn light 10. The movable contact 41 is associated in normally open relationship to a pair of terminals which are interposed in a conductor 46 interconnecting the conductor 45 with the conductor 35 leading to the right front turn light 10. The movable contact 42 is associated in normally open relationship to a pair of terminals which are interposed in a conductor 47 interconnecting conductor 45 with the conductor 26 leading to the movable element 16 of the directional turn signal switch 14. The movable contact 43 is associated in normally closed relationship to a pair of terminals interposed in the conductor 25 of the brake signaling circuit. A conductor 48 connects one side of the coil of the relay solenoid 39 to the electrical power source B through the conductor 25 and the fuse element 21. The opposite side of the relay coil 39 is adapted to be connected to a ground terminal through either a pushbutton-type switch 49, which is normally open, or the acceleration switch 38. A conductor 50 connects a terminal of the switch 49 to a terminal of the relay coil 39 with the other terminal of this switch being grounded. A holding circuit for operation of the relay 37 is provided by a conductor 51, which connects with the conductor 50 and a ground terminal, through a normally closed, pushbutton-type reset switch 52. The movable contact 44 of the switch mechanism 37 is associated in normally open relationship to a pair of terminals interposed in the holding circuit conductor 51.

Incorporated in the acceleration-responsive switch 38 are a pair of normally open contacts 53 having one contact thereof connected to the conductor 50 by a conductor 54, and the opposite contact connected to a ground terminal. The contact of the pair 53 connected to conductor 54 is carried by a pendulum arm 55 which is pivotally mounted at 56 for swinging movement in a vertical plane. The opposite contact is carried by a structure 57 which may include resilient means to support the contact in proper relationship for engagement by the opposite contact. Carried at the free end of the pendulum arm 55 is a relatively heavy mass formed by a magnet structure 58 which may be of the permanent magnet type. A second magnet structure 59 which may also be of the permanent magnet type is supported in a relatively fixed position and within the arc of movement of the first magnet 58. The two magnets 58 and 59 are relatively oriented with like poles being placed adjacent each other. Thus, the magnet 58 will tend to be repelled by the magnet 59 and the magnets will tend to be maintained in relatively separated relationship as determined by the particular weight of the magnet 58 and the gravitational effect thereon.

The pendulum arm 55 and magnets 58 and 59 and the contact structure 57 are preferably mounted within a suitable housing 60 which is adapted to be mounted in fixed relationship to the frame of the vehicle. The mounting relationship of the acceleration switch 38 is graphically indicated by the directional arrows labeled "forward" and "up" thus indicating that the pendulum arm 55 will be supported for movement in a vertical plane. The magnet 59 is secured to a wall of the housing 60 at a position which is relatively forward of the magnet 58 carried by the pendulum arm 55. The acceleration switch 38 will thus be responsive to deceleration forces acting on the vehicle on which the structure is mounted while the vehicle is moving in a forward direction. If the deceleration force is above a specific magnitude as determined by the strength of the magnets 58 and 59 and the particular mounting of the pendulum arm 55, the magnet 58 will be caused to swing toward the magnet 59 and bring the contacts 53 into electrically conductive engagement. In the illustrated embodiment, the pendulum arm 55 is restricted in clockwise rotation by a stop 61 formed by a shock-absorbing material fastened to the interior wall of the housing 60. The magnet 58 will thus engage the material 61 until a deceleration force acts on the apparatus to cause the magnet 58 to swing toward the magnet 59. A feed-through insulator 62 is mounted in the wall of the housing 60 to protect the conductor 54 as it passes into the interior of the housing.

In the normal quiescent state of operation of the apparatus, the electrically-actuated switch 37 will remain in the illustrated configuration with the contacts 40–44 in a first position and permit normal operation of the brake signaling system and the directional turn signaling system. However, at any time that the vehicle should be subjected to a deceleration force above the predetermined magnitude which will cause the acceleration-responsive switch 38 to be actuated and result in engagement of the contacts 53 to form an electrically conductive path to ground, the additional circuit means of this invention will be brought into operation to provide an emergency signaling system. Completing an electrical circuit to ground through contacts 53 will result in energization of the coil 39 of the relay switch 37 and cause operation of the respective movable contacts 40 through 44 and effect their transfer from a first position to a second position. Movable contact 44 will thus engage its respective terminals and form a holding circuit through the conductor 51 to maintain the relay coil 39 energized. The movable contact 40 will be displaced to open-circuit conductor 19 while forming a closed circuit in the conductor 45. The movable contacts 41 and 42 will also be displaced to complete an electric circuit from the conductor 45 through the respective conductors 46 and 47 to the elements connected thereto. Simultaneously, the movable contact 43 will be disengaged from its respective terminals and form an open circuit in the conductor 25 thus interrupting the operation of the brake signaling system. Open circuiting the conductor 19 will prevent subsequent operation of the directional turn signal switch from being effective in energizing the respective turn lights. An electrical circuit, however, will be completed to both front turn lights and both rear brake and turn lights 11 through the respective conductors 45, 46, and 47. With an electrical circuit thus completed, the flasher switch 20 will be effective to perform the cyclically operable function to provide a flashing signal by the lights 10 and 11.

Although the acceleration-responsive switch 38 is only effective during the time that deceleration forces are acting on the elements thereof to complete a circuit through the contacts 53, a circuit is maintained through the holding circuit formed by the contact 44 in the conductor 51 to the ground terminal. After the deceleration forces have diminished to a predetermined value, contacts 53 will open and the circuit will be maintained through the conductor 51 and the pushbutton switch 52. Operation of the signaling system in this emergency flashing mode will continue until the reset switch 52 will be operated to open-circuit the conductor 51 and thus deenergize the relay coil 39. Deenergization of the relay coil 39 will release the movable contacts 40 through 44 which will return to their initial first position as illustrated in FIGURE 1. Subsequent release of the reset switch 52 to close its respective contacts will not again initiate operation of the emergency signaling system. At this time, the signaling system will revert to its normal turn and brake signaling functions.

Manual operation of the signaling system in the emergency signaling mode may be initiated through actuation of the test switch 49. Closing of the switch 49 will complete a circuit to energize the relay coil 39, as in the case of closing the contacts 53 of the acceleration switch 38, and the circuit will operate as previously described. It will be noted that the test switch 49 need not be maintained in a closed position for continued operation of the system. As in the case with automatic operation, the circuit may again be returned to its normal turn and brake signaling functions through operation of the reset switch 52 which will interrupt the holding circuit for the electrically-actuated switch 37.

A modified signaling system is illustrated in FIGURE 2 which is to be incorporated in the circuit as shown in FIGURE 1. This modification comprises utilizing the conventional tail lights 63 and 64 to perform the signaling function at the rear of the vehicle. The only change required to incorporate this modification is alteration of the connection of the conductor 47a to permit illumination of the tail lights 63 and 64 as in a conventional system and as an alternate function to include the tail lights in the emergency signaling system. Thus, the electrically-actuated switch 37a includes a second set of terminals with which the movable contact 42a is normally disposed in closed relationship. One terminal of this set of contacts is connected to an electrical supply source, such as the vehicle's battery B, through the normal control switch while the opposite terminals of this set are connected to the conductor 47a. Thus, the signaling system in a quiescent state of operation where the directional and rear brake signaling systems are operative will permit energization of the tail lights 63 and 64 through a conductor 65 which interconnects the lights and connects with the conductor 47a. When the solenoid 39a is energized, the movable contact 42a will be displaced to complete a circuit through the normally open set of terminals as in the case with the circuit described in FIGURE 1. In this instance, the tail lights 63 and 64 will then be illuminated intermittently through the operation of the flasher switch 20 to provide the necessary signaling function. It will also be noted with respect to this circuit modification that the terminals interposed in the conductor 25a of the brake signaling circuit are bypassed with a jumper wire 25b to prevent disconnection of the brake signaling system. Thus, the brake lights will be operative also upon actuation of the braking mechanism in conjunction with the simultaneous operation of the emergency signaling system as determined by the operation of the acceleration-responsive switch.

It will thus be readily apparent from the foregoing detailed description of the signaling system of this invention that this emergency signaling system provides an automatic indication of an emergency stop resulting from rapid deceleration of the vehicle. The signaling system is incorporated with the conventional turn and brake signaling systems and permits the selective operation subject to be overridden by operation of the emergency signaling system as determined by the acceleration-responsive switch 38. The signaling system is automatically operative and does not require manual operation by the vehicle operator to initiate an emergency signal.

Having thus described this invention, what is claimed is:

1. A vehicle signaling system comprising an electric power source, a directional turn indicating system including electrically operated turn signaling means, manually operated switch means interconnecting with said power source and said turn signaling means and being selectively operable for causing operation of said turn signaling means to indicate a specific turn, and cyclically operable, normally closed switch means interconnected with said power source for cyclically interrupting said turn signaling means; and additional circuit means interconnected with said power source and said directional turn indicating system including electrically actuated switch means normally in a first position permitting control of operation of said turn signaling means by said manually operated switch means and selectively operable to a second position to disable said manually operated switch means and to complete an alternate circuit to all of said turn signaling means for concurrent operation thereof through said cyclically operable switch means, and an acceleration responsive switch connected in circuit with said electrically actuated switch means for effecting transfer therefrom said first position to said second position upon deceleration of the vehicle at a rate greater than a predetermined value.

2. A vehicle signaling system according to claim 1 wherein said additional circuit means includes a holding circuit interconnected with said electrically actuated switch means for maintenance thereof in said second position, said holding circuit including a normally closed switch which is selectively operable to an open position interrupting said holding circuit and permitting return of said electrically actuated switch means to said first position.

3. A vehicle signaling system according to claim 1 wherein said acceleration responsive switch includes an arm pivotally supported for swinging movement, a first electrical contact carried by said arm, a second electrical contact cooperatively engageable with said first electrical contact supported in relatively fixed relationship to said first contact, first magnetic means carried by said arm, and second magnetic means fixedly supported in magnetically repelling relationship to said first magnetic means to normally maintain said first electrical contact disengaged from said second electrical contact and permit engagement thereof when said acceleration switch is subjected to a deceleration force greater than said predetermined value to complete an electrical circuit.

4. A vehicle signaling system according to claim 3 wherein said acceleration responsive switch includes a fixed stop cooperatively engageable with said arm to limit displacement of said first magnetic means from said second magnetic means.

5. A vehicle signaling system according to claim 3 wherein said arm is supported for forward swinging movement in a vertical plane from a position in which said first and second electrical contacts are disengaged to a position where said contacts are engaged in response to a deceleration force, and said second magnetic means is disposed with the magnetic field thereof intercepted by the arc of movement of said first magnetic means.

6. A vehicle signaling system according to claim 5 wherein said arm is urged toward a rearward, angularly displaced relationship to a vertical axis by interaction of the magnetic fields of said first and second magnetic means.

7. A vehicle signaling system according to claim 3 wherein said first and second magnetic means comprise permanent magnets having like poles thereof disposed adjacent each other.

8. A vehicle signaling system according to claim 1 wherein said electrically actuated switch means comprises a plurality of electrical contacts and an electrical solenoid mechanically coupled therewith for effecting transfer of said contacts from a first position to a second position upon energization of said solenoid, said solenoid being connected in circuit with said electric power source to by-pass said cyclically operable switch means and connected in circuit with said acceleration responsive switch.

9. A vehicle signaling system according to claim 1 wherein said directional turn indicating system includes independently operable turn signaling means for indicating a respective direction of turn.

10. A vehicle signaling system according to claim 1 wherein said turn signaling means includes first turn signaling means disposed at the front of the vehicle and second turn signaling means disposed at the rear of the vehicle, and the vehicle signaling system comprises auxiliary switch means interconnected with said manually operated switch means for independent operation of said second turn signaling means, said electrically actuated switch means being interconnected with said auxiliary switch means to disable said auxiliary switch means when in said second position and cyclically operate said rear turn signaling means.

11. A vehicle signaling system according to claim 1 which includes auxiliary electrically operated signaling means disposed at the rear of the vehicle and connected in circuit with said electrically actuated switch means to permit independent operation thereof when said electrically actuated switch means is in said first position and to cyclically operate said auxiliary signaling means when said electrically actuated switch means is in said second position.

12. A vehicle signaling system according to claim 1 wherein said additional circuit means includes a normally open switch connected in circuit with said electrically actuated switch means and in shunt relationship to said acceleration responsive switch, said normally open switch being selectively operable to effect transfer of said electrically actuated switch means from said first to said second position.

References Cited

UNITED STATES PATENTS

| | | | |
|---|---|---|---|
| 1,288,128 | 12/1918 | Murray | 340—262 |
| 2,618,712 | 11/1952 | Moledzky | 200—61.51 |
| 3,089,129 | 5/1963 | Nassikas et al. | 340—262 |
| 3,251,033 | 5/1966 | Lawyer | 340—61 |
| 3,295,101 | 12/1966 | Ellis | 340—54 |

THOMAS B. HABECKER, *Primary Examiner.*

K. N. LEIMER, *Assistant Examiner.*

U.S. Cl. X.R.

200—61.48; 340—61, 67, 81, 262.